(12) United States Patent
Priebe (10) Patent No.: US 7,934,524 B2
(45) Date of Patent: May 3, 2011

(54) LOG SPLITTER SYSTEM FOR A FRONT-LOADER TRACTOR

(76) Inventor: Dean R. Priebe, Prospect, CT (US)

( * ) Notice: Subject to any disclaimer, the term of this patent is extended or adjusted under 35 U.S.C. 154(b) by 368 days.

(21) Appl. No.: 12/038,206

(22) Filed: Feb. 27, 2008

(65) Prior Publication Data

US 2008/0271817 A1 Nov. 6, 2008

Related U.S. Application Data

(60) Provisional application No. 60/927,376, filed on May 3, 2007.

(51) Int. Cl.
*B27L 7/00* (2006.01)
(52) U.S. Cl. .................................... 144/195.8
(58) Field of Classification Search .................. 144/192, 144/193.1, 193.2, 195.8, 195.1, 194, 195.6, 144/195.7
See application file for complete search history.

(56) References Cited

U.S. PATENT DOCUMENTS

| | | | | |
|---|---|---|---|---|
| 3,974,867 A * | 8/1976 | Butas, Jr. | ................... | 144/195.1 |
| 4,112,985 A | 9/1978 | Gosselin | | |
| 4,128,117 A * | 12/1978 | Terry et al. | ...................... | 144/4.6 |
| 4,153,088 A | 5/1979 | King et al. | | |
| 4,209,046 A * | 6/1980 | Lavigne | ...................... | 144/195.7 |
| 4,258,765 A | 3/1981 | Suomi | | |
| 4,278,118 A * | 7/1981 | Larson | ....................... | 144/195.1 |
| 4,285,374 A | 8/1981 | Klingel | | |
| 4,337,809 A * | 7/1982 | Bertolette et al. | .......... | 144/195.1 |
| 4,374,532 A * | 2/1983 | Region | ........................ | 144/195.1 |
| 4,398,581 A * | 8/1983 | Aikins et al. | ................... | 144/366 |
| 4,412,570 A * | 11/1983 | Nickerson | ................... | 144/195.1 |
| 4,446,898 A | 5/1984 | Manteufel | | |
| 4,488,585 A * | 12/1984 | Kendziorski | ................ | 144/195.7 |
| 4,503,894 A | 3/1985 | Gratkowski | | |
| 4,506,712 A | 3/1985 | Johnson | | |
| 4,697,404 A * | 10/1987 | Brockmeier et al. | ................ | 56/6 |
| 4,782,866 A * | 11/1988 | Valdez | ........................ | 144/195.8 |
| 4,800,937 A * | 1/1989 | Mangus, Sr. | ................ | 144/195.1 |
| 4,860,806 A * | 8/1989 | Brace | ......................... | 144/195.8 |
| 4,869,002 A | 9/1989 | Glenn | | |
| 4,945,960 A * | 8/1990 | McCauley | .................. | 144/195.1 |
| 4,951,726 A * | 8/1990 | Sieverin | ........................ | 144/366 |
| 4,961,452 A * | 10/1990 | Hudson | ....................... | 144/195.1 |
| 5,287,902 A * | 2/1994 | Jeantelot | ........................ | 144/366 |

(Continued)

*Primary Examiner* — Dana Ross
*Assistant Examiner* — Jennifer Chiang
(74) *Attorney, Agent, or Firm* — McCormick, Paulding & Huber LLP (57) ABSTRACT

A tractor has a log splitter installed on two loader arms pivoted at a front end of the tractor. The log splitter includes a frame for attachment to the loader arms. The frame includes a surface, to which a ram and a wedge are coupled. An actuator mounted to the frame moves the ram and/or the wedge to split a log received between the ram and the wedge. The wedge includes a main blade and a cross blade perpendicular to the main blade. An edge of the cross blade is offset from an edge of the main blade so as to reduce the force required to achieve a four-way split of the log. The wedge and the frame are designed to enable inverting the log splitter to grasp a log, then raising the inverted log splitter to split the log directly into a truck bed. The uniquely designed hydraulic tank-ballast box combination provides an owner an external high volume hydraulic system without impeding the capability of the tractor hydraulic system. The tank and ballast box hitch assembly can also integrate the pump mounted to the hitch frame allows one to remove all components together.

4 Claims, 6 Drawing Sheets

U.S. PATENT DOCUMENTS

| | | | |
|---|---|---|---|
| 5,337,810 A * | 8/1994 | McCormack | 144/195.1 |
| 5,346,018 A | 9/1994 | Koster | |
| 5,803,141 A | 9/1998 | Patterson | |
| 5,957,175 A * | 9/1999 | Smith | 144/195.1 |
| 6,320,226 B1 | 11/2001 | Gu et al. | |
| 6,408,907 B1 | 6/2002 | Lantz | |
| 6,520,226 B1 | 2/2003 | Smith | |
| 6,609,547 B1 | 8/2003 | Machkovech | |
| 6,640,852 B1 * | 11/2003 | Rogers | 144/195.1 |
| 6,763,864 B2 | 7/2004 | Setlack et al. | |
| 6,769,464 B1 | 8/2004 | Jenkin | |
| 7,066,223 B2 * | 6/2006 | Stone | 144/195.1 |
| 7,104,295 B2 | 9/2006 | Heikkinen et al. | |
| 7,124,794 B2 * | 10/2006 | Marx | 144/193.2 |
| 7,669,618 B1 * | 3/2010 | Halverson | 144/4.6 |
| 2003/0155037 A1 * | 8/2003 | Alexander | 144/195.1 |
| 2003/0230360 A1 | 12/2003 | Setlack et al. | |
| 2005/0279423 A1 * | 12/2005 | Albright | 144/193.1 |

* cited by examiner

LOG SPLITTER SYSTEM FOR A FRONT-LOADER TRACTOR

CROSS-REFERENCE TO RELATED APPLICATION

The present application is entitled to the benefit of and hereby incorporates by reference essential subject matter disclosed by U.S. Provisional Application Ser. No. 60/927,376 filed May 3, 2007.

FIELD OF THE INVENTION

The present invention relates to powered log splitters, and more particularly to portable powered log splitters adapted for installation and use on front-loader tractors.

BACKGROUND OF THE INVENTION

Logs may be split into smaller pieces for storage, for immediate use as firewood, or for disposal among other purposes. One way to split logs is by using a hand tool, such as an axe. However, using a hand tool to split a large number of logs results in fatigue and increased risks of physical injury either from an accident, or from repetitive motion.

To better handle large numbers of logs, logs too large to split by hand, or logs that are particularly hard to split, powered log splitters of various designs have been developed. Some powered log splitters are designed to be portable on and with host vehicles. Portable powered log splitters include both permanently installed splitters on host vehicles built for log splitting, and removably installed splitters on multi-purpose host vehicles such as tractors or skid loaders.

Some removably installed log splitters can be difficult to install to a host vehicle. In particular, some designs require the user to lift the log splitter into position for installation. Even if a user has the strength to lift a machine capable of splitting logs it can be difficult to lift the machine, potentially weighing more than 200 pounds, while simultaneously maintaining the requisite coordination for proper installation.

Installation also is difficult for most powered log splitter attachments because of the operating controls for the splitter. Powered log splitters commonly use piston actuators. Portable piston actuated splitters typically use the host vehicle's hydraulic system to drive the piston. Installation of such splitters requires making connections to the host vehicle hydraulic system. Alternatively, the piston may be an original component of the host vehicle, with additional components added to make the host vehicle piston function as part of a log splitter. For example, U.S. Pat. No. 4,341,246 to Salladay and European Pat. App. No. 0038375-A1 to Berr require special parts to be added to the host vehicle in order to use the host vehicle's hydraulic cylinder. Because the host vehicle hydraulic systems and pistons are not usually designed for log splitting, such designs inherently are inefficient and unreliable.

A further problem with many powered log splitters is that the user must manually lift and position logs on the splitter. Such designs are disclosed in U.S. Pat. No. 4,506,712 to Johnson, U.S. Pat. No. 4,503,894 to Gratkowski, U.S. Pat. No. 4,446,898 to Manteufel, U.S. Pat. No. 4,340,098 to Scott, U.S. Pat. No. 4,262,714 to Pratt et al., U.S. Pat. No. 4,019,549 to Williams, and PCT International Publication Number NO 92/21491 to Sleling. Many potential users may not even be able to lift the logs off the ground. Even if a potential user could lift a log, logs are heavy and present a risk of back injuries. Lifting ergonomics is easy to forget when performing the activity of log splitting. The positioning of the body to lift properly is not always the first thing on a person's mind. The risk of injury increases dramatically when logs of approximately twenty-four inches (24") in diameter are lifted. Additionally, logs can be slippery when wet. This can add further risk of injury when lifting logs to be split. Moreover, in many designs where the user must manually position the log with respect to the splitter for operation, the user typically must stand by the splitter to operate the splitter controls. Standing by the splitter during operation reduces the efficiency of the machine because the host vehicle cannot be relocated or used to move logs during splitting operations.

In a few prior art designs, the user remains seated in or on the host vehicle both while operating the vehicle to pick up logs, and while operating the splitter. However, even designs permitting operation of the splitter from the host vehicle seat have drawbacks that limit splitting operation or maneuverability of the host vehicle. For example, some portable power log splitters are removably mounted to skid steer loaders. Each known log splitter of this type uses the hydraulic system of the skid steer loader to power the piston actuator of the splitter. In addition to the installation difficulties discussed above, in skid steer mounted designs where a log splitter longitudinal axis is parallel with the longitudinal axis of the skid steer, a log lying on the ground is difficult to align in the pick up opening of the splitter. Even for skid steer mounted log splitters where the log splitter longitudinal axis is transverse to the longitudinal axis of the skid steer, the turning principle of the skid steer limits the operator's ability to quickly align the opening for an efficient pickup of the log.

The problem of aligning the splitter to pick up a log is even worse for tractor towed log splitters. Many of these designs in operation are no different than a traditional log splitter where the operator stands next to the splitter to complete the work, except that the skid steer or tractor can be used to move the log splitter to a new splitting location. When the skid steer hydraulic system is used to power the portable log splitter, equipment run hours build up on the entire skid steer while the operator is really just standing in front of the loader splitting wood.

Known log splitters towed by tractors also have no capability to split wood into a truck bed. Known log splitters that are mounted on skid steers have only limited capability to split wood directly into a truck bed because of the height, range of motion, and tight design of the loader. In particular, the skid steer lifting arm design limits the lifting radius and height of the splitter. The geometry of the lifting arm relative to the skid steer chassis also makes it difficult to position a skid steer mounted log splitter over a truck bed. Thus, most known portable splitters are helpful for splitting logs, but do not enable simultaneous moving and splitting of logs, as would be helpful to make more efficient the time consuming task of loading split wood for transport.

Although the wood splitter disclosed in U.S. Pat. No. 5,803,141 to Patterson can grasp logs resting on the ground and can move the logs over a receptacle before splitting the logs, the Patterson wood splitter is pivotally connected in hanging fashion to a boom of a host vehicle. The Patterson patent also has two rotatably connected components. Pivotally and rotatably connected components are complicated to assemble, require maintenance, and are structurally weak. The aforementioned characteristics make pivotally and rotatably connected assemblies undesirably expensive and difficult to retrofit to or install on standard multi-use tractors or other host vehicles.

In view of the foregoing, there is a need for a log splitter mountable on the loader arms of a front-loader tractor, combined with a system to supply the necessary hydraulics, which permits a user to load and split logs in an efficient manner with the further ability to move logs for storage or load logs for transport during the splitting operation. Accordingly, it is a general object of the present invention to provide a log splitter device that overcomes the problems and drawbacks associated with prior art log splitter devices.

BRIEF SUMMARY OF THE INVENTION

In one aspect of the present invention, a tractor includes a log splitter installed on two loader arms pivoted at a front end of the tractor. The log splitter includes a frame for attachment to the loader arms. The frame includes a surface, to which a ram and a wedge are coupled. An actuator mounted to the frame moves the ram and/or the wedge to split a log received between the ram and the wedge. The wedge includes a main blade and a cross blade substantially perpendicular to the main blade. In a preferred design, an edge of the cross blade is offset from an edge of the main blade so as to reduce the force required to achieve a four-way split of the log. The wedge and the frame are designed to enable inverting the log splitter to grasp a log on the ground, then raising the inverted log splitter to split the log directly into a truck bed.

In an embodiment of the present invention, the actuator is a hydraulic cylinder powered by a hydraulic system external to the tractor, so that the tractor hydraulic capacity does not limit the operability of the log splitter. Accordingly, the log splitter is usable on tractors of various sizes, including the smaller lawn and garden tractors owned by homeowners.

Preferably, the external hydraulic system includes a hydraulic reservoir that can be mounted to a typical small tractor by a reservoir support attachable to the OEM three-point hitch. The reservoir support provides a ballast box, a tool storage box, and a receiver hitch enabling the tractor to tow a cart or other attachment while the hydraulic reservoir is mounted.

The frame and the wedge are designed to enable grasping and lifting the log from the ground so as to split the log directly into a container such as a truck bed. The frame is designed so that the tractor operator can use the tractor's factory-installed loader bucket joystick to move the log splitter to an inverted position for grasping the log. Additionally, the frame is designed so that the log can be grasped between the ram and the wedge at a location visible to a tractor operator seated on the tractor. The wedge is designed to securely grasp the log while the splitter is inverted, to direct split pieces of the log into the truck bed, and to reduce binding of the log against the wedge or the surface of the frame.

These and other objects, features and advantages of the present invention will become apparent in light of the detailed description of the embodiments thereof, as illustrated in the accompanying drawings. The illustrated embodiments of the log splitter device are intended to illustrate, but not to limit, the invention.

BRIEF DESCRIPTION OF THE DRAWINGS

Throughout the following detailed description of preferred embodiments, like reference numerals refer to like components in the several drawing views.

DETAILED DESCRIPTION OF PREFERRED EMBODIMENTS

Figure 1:
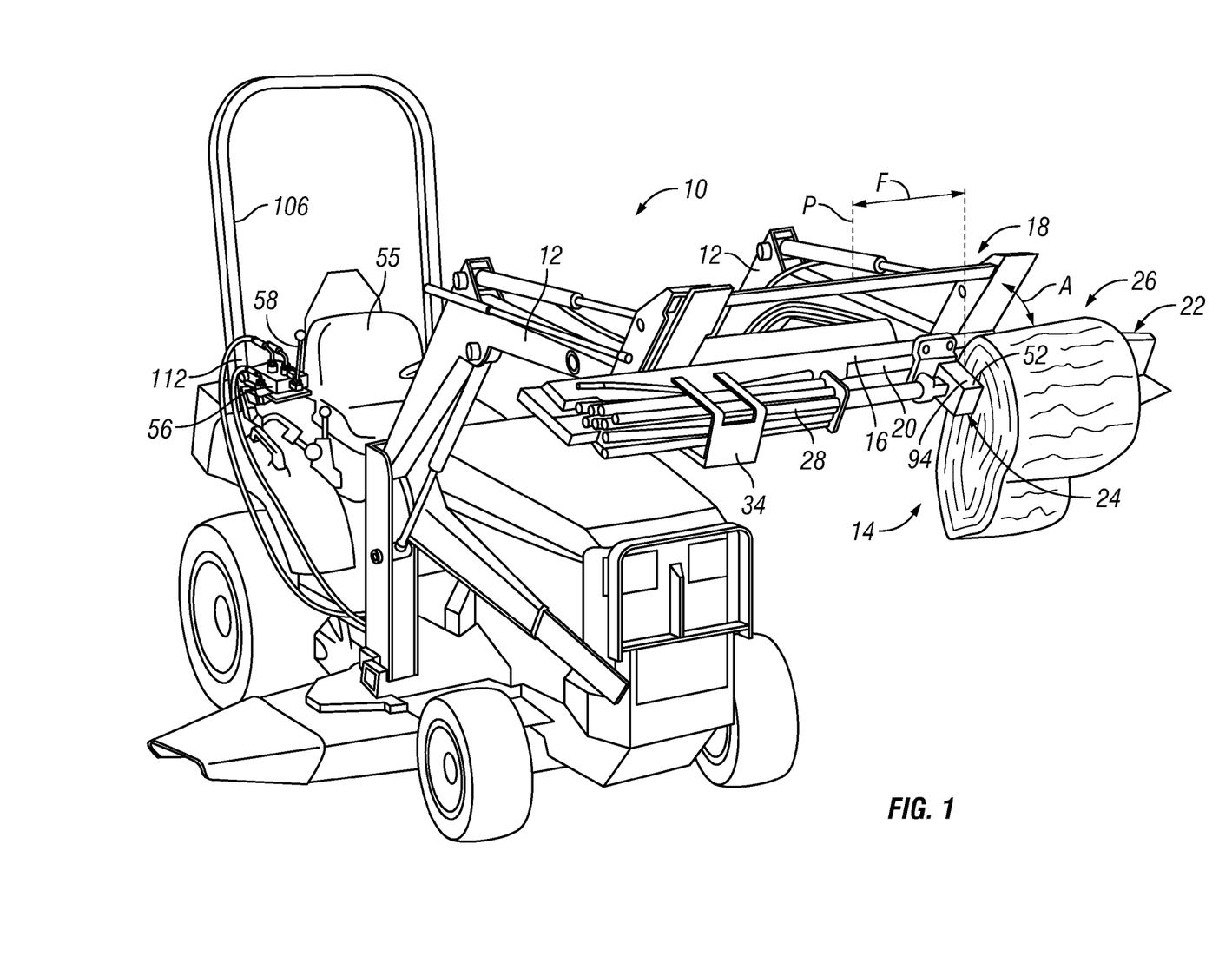
FIG. 1 is a perspective view of a portable powered log splitter installed on a front-loader tractor, according to an embodiment of the present invention.

Referring to FIG. 1, a common front-loader tractor 10 has two loader arms 12 pivoted at a front end of the tractor. A log splitter 14, in accordance with the present invention, includes a beam 16 removably attachable to the loader arms 12 by a frame 18, as described in more detail below. The beam 16 defines a working surface 20 to which a wedge 22 and a ram 24 are coupled. The ram 24 and the wedge 22 cooperate to define a log opening 26 for receiving a log. When the log is received in the log opening, the working surface 20 closely abuts a surface of the log. An actuator 28 is mounted to the beam 16 and is operable to cause relative movement between the ram 24 and the wedge 22 along the working surface 20, thereby adjusting the width of the log opening 26. In a preferred embodiment, the actuator 28 is coupled to the ram 24, and is operable to move the ram 24 along the working surface 20, toward and away from the wedge 22.

A. Frame

Figure 2A:
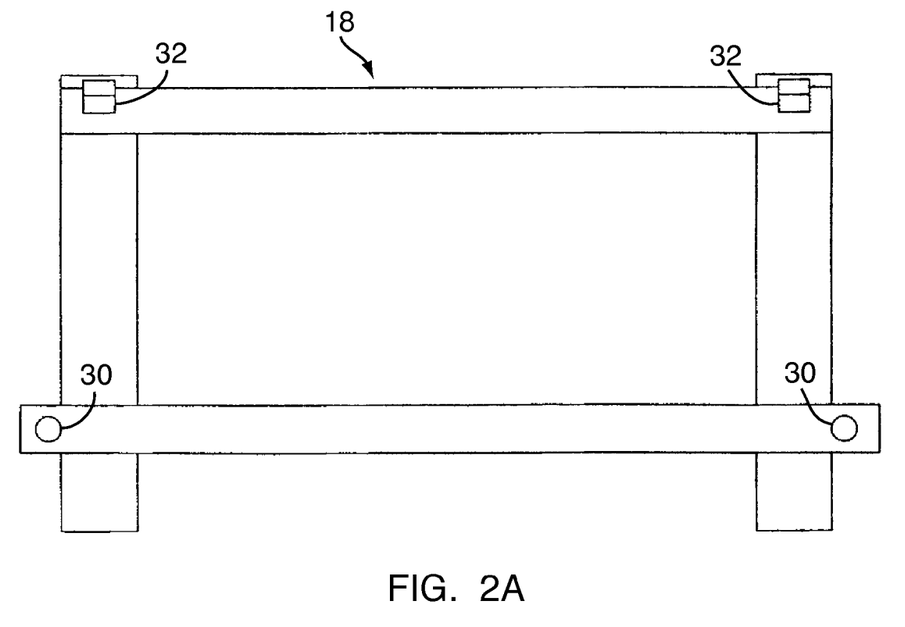
FIG. 2 is an assembly view of a frame and a mounting mechanism used with the log splitter of FIG. 1, according to an embodiment of the present invention.
Figure 2B:
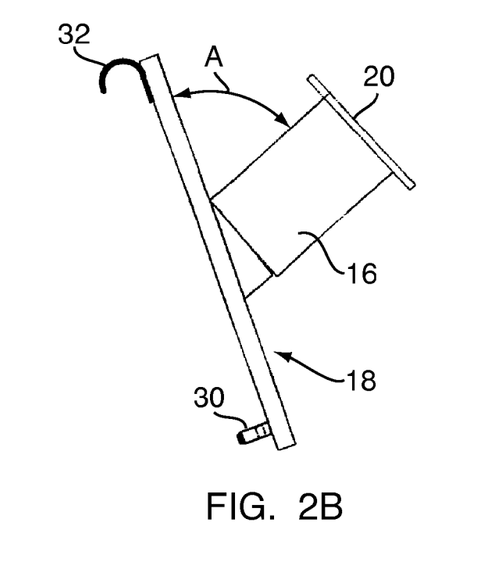

In a typical front-loader tractor design, a removable loader bucket is attachable to bucket brackets provided on each of the loader arms 12. A factory-installed joystick is operable to control a factory-installed hydraulic manifold that ports hydraulic fluid from the tractor's hydraulic system to move the loader arms 12 so as to raise and lower the loader arms. The factory-installed joystick also is operable to rotate the removable loader bucket between a loading position and a dumping position. To use the log splitter 14 of the present invention, a user must remove the pre-existing loader bucket from the loader arms 12 according generally to the manufacturer's instructions. The log splitter 14 can be mounted to the exposed loader arms and secured in place using the frame 18, which engages the bucket brackets of the loader arms 12. Preferably, as shown in FIGS. 2A and 2B, the frame 18 comprises two one-and-a-quarter inch (1.25") pins 30 for mating with lower bucket brackets of the loader arms 12, and the frame 18 also includes two hooks 32 for mating with upper bucket brackets of the loader arms 12. Once mated with the bucket brackets, the pins 30 and the hooks 32 hold the frame 18 firmly in place with cotter locking device securing frame pins 30 to the loader arms 12. Thus, the tractor operator can operate the factory-installed joystick to move the working surface 20 relative to the ground without any hydraulic connections being made for this purpose to the log splitter 14.

In an embodiment of the present invention, the range of motion of the working surface 20 of the log splitter 14 is controlled by an angle A defined by the frame 18 and the beam 16, as shown in FIG. 2B. A thirty to fifty degree (30°-50°) value is preferred for the angle A that will permit the log splitter 14 to efficiently function both in an inverted position and in an upright position. The angle A is set to ensure that the log splitter 14 can be operated in the inverted position, that is, with the working surface 20 substantially parallel to and preferably facing the ground, so that the wedge 22 is positioned below the working surface. The splitter 14 can be placed in an inverted position by moving the factory-installed joystick to the dumping position. Inverted operation allows the tractor operator to accurately position the log splitter 14 so as to efficiently pick up and split the log. Inverted operation also enables the tractor operator to position the splitter 14 over a container, such as a truck bed, so that the split log will fall from the splitter 14 into the container with little risk of catching on the splitter components.

Figure 3A:
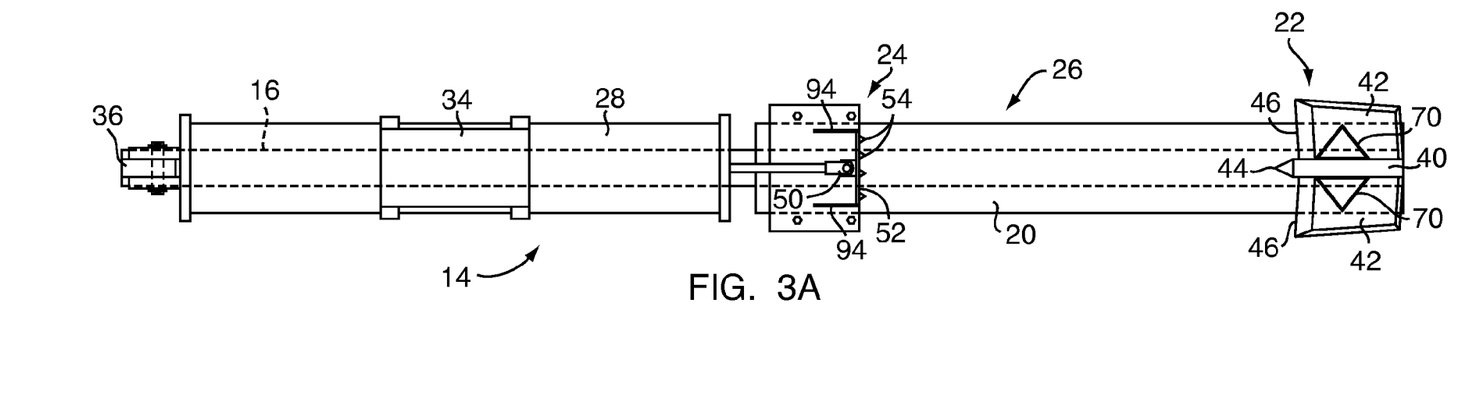
FIG. 3 is an assembly diagram of the log splitter of FIG. 1, according to an embodiment of the present invention.
Figure 3B:
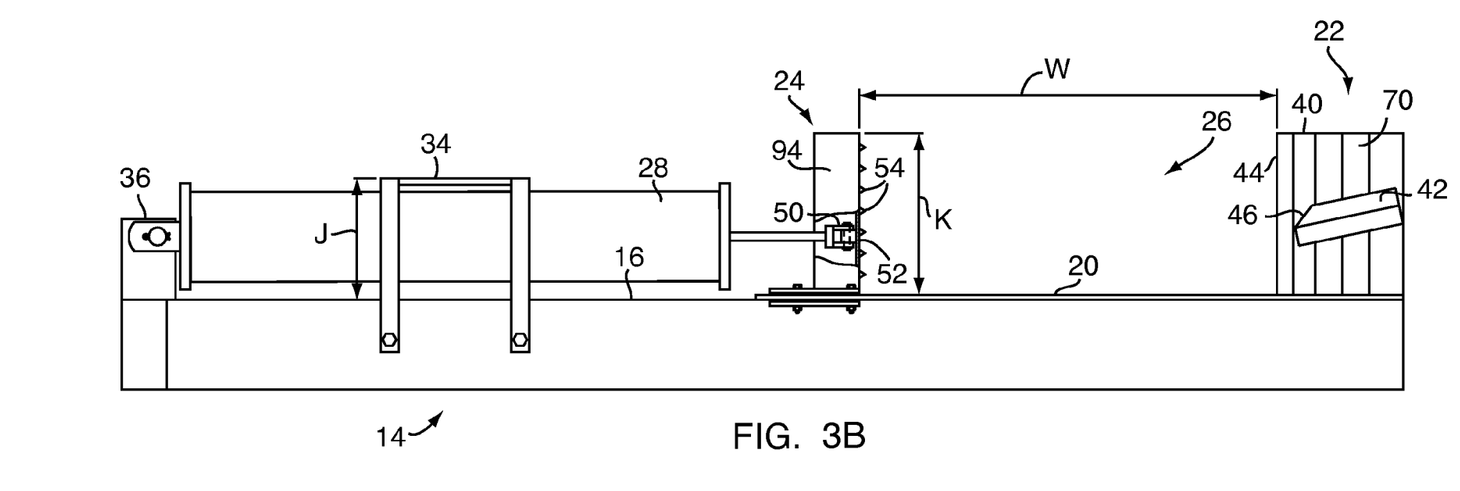

In the embodiment shown in FIGS. 1-3, a skid plate 34 is connected to the beam 16 and is disposed parallel to the working surface 20. The skid plate 34 prevents the actuator 28 from contacting the ground when the log splitter 14 is inverted to pick up the log. For ease of assembly and maintenance, the skid plate 34 provides space for the actuator 28 and the ram 24 to be assembled to or removed from the beam 16. Additionally, the skid plate 34 leaves substantially all of the actuator 28 exposed to the air for cooling, while preventing impact of the actuator 28 against the ground. In a preferred embodiment, the skid plate 34 is disposed at a height J of nine to twelve inches (9"-12") from the working surface 20.

The beam 16 also includes a lug 36 or similar means for removably attaching the actuator 28, permitting later repair or replacement of the actuator.

B. Wedge

Figure 4A:
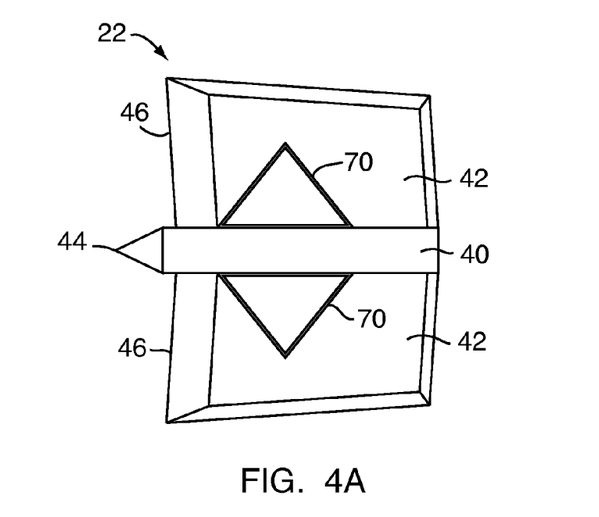
FIGS. 4A-4C are orthogonal views of a wedge usable in the log splitter of FIGS. 1-3, according to an embodiment of the present invention.
Figure 4B:
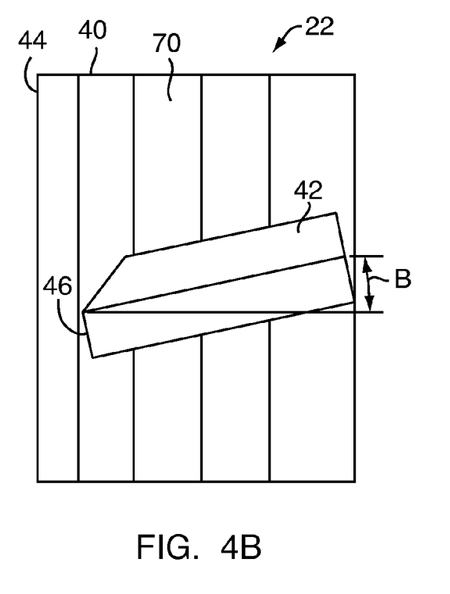
Figure 4C:
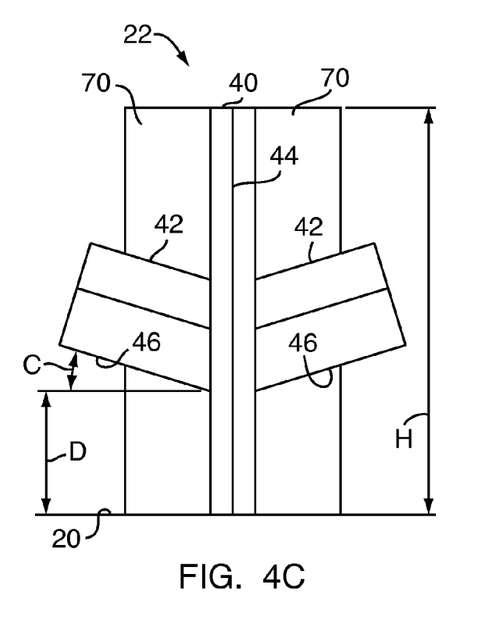

In an embodiment, as shown in FIGS. 4A-4C, the wedge 22 includes a main blade 40 and two cross blades 42. The wedge 22 is designed to safely and efficiently split large logs while the log splitter 14 is raised from the ground. The wedge 22 is especially adapted for splitting logs when the beam 16 is in the inverted position, that is, oriented with the main blade 40 substantially perpendicular to the ground and protruding downward from the working surface 20. As shown in FIGS. 1-3, the wedge 22 may be fixedly mounted by welding near an end of the working surface 20. Durable contact adhesive, or sturdy fasteners, could also be used to mount the wedge 22 to the working surface 20. Alternatively, the wedge 22 could be fixedly secured to a mount fixedly attachable to the beam 16, wherein the mount and the beam 16 are adapted for attachment of the mount in several locations relative to the ram 24.

As shown in FIG. 4B, the main blade 40 has a main edge 44 and each cross blade 42 has a cross edge 46. Each cross blade 42 is fixedly mounted to the main blade 40 and is substantially perpendicular to the main blade. Each cross edge 46 is substantially offset from the main edge 44, as shown in FIGS. 4A and 4B, so that the log being pressed against the edges 44, 46 will contact the main edge 44 first, and then the cross edges 46. As so designed, the log begins splitting into two pieces after contacting the main edge, and then contacts the cross edges. After contacting the cross edges, the log begins splitting into four pieces. Sequential contact of the log against edges 44, 46 thereby reduces the force and power required to split the log into four pieces, compared to simultaneous contact of the log against both edges. Alternatively, the edges 44, 46 could be offset in such a manner that the log would contact the cross edge 46 first, and then the main edges 44.

Welded attachment of the cross blades 42 to the main blade 40 is advantageous for inverted operation. Prior log splitter devices typically have a main wedge blade welded to a frame. Where a four-way wedge has previously been desired, a user would add a slip-on device or detachably connected cross blades. Slip-on cross blades cannot be used for inverted operation, because such cross blades would slip off the main blade in the inverted position as described above. Detachably connected cross blades would tend to cause jamming or binding of logs against protruding removable fasteners. The positioning of detachable cross blade fasteners also would interfere with use of the wedge, especially in the inverted position. Thus, welding is the preferred method for attachment of the cross blades 42 for inverted operation. Durable contact adhesives or non-protruding fasteners also could be used to fixedly mount the cross blades 42 to the main blade 40.

The wedge 22 of the present invention also includes two spreaders 70 that extend parallel to sides of the main blade 40. The angled cross section of the spreaders 70, as best shown in FIG. 4A, enhances the splitting action of the main blade to reduce friction of the log against the sides of the main blade 40.

A tilt angle B, a wing angle C, a distance D, and a height H of the wedge 22 allow large or difficult logs to be pushed though the wedge without getting lodged, stuck, or jammed onto the wedge, between the wedge and the ram 24, or between the wedge and the working surface 20. Each of the cross blades 42 defines the tilt angle B relative to a plane parallel to the working surface 20, as shown in FIG. 4B. A value between five to fifteen degrees (5°-15°) is optimal for the tilt angle B. The tilt angle B helps to guide split pieces of the log away from the working surface 20. Guiding split pieces of the log away from the working surface 20 reduces the risk of jamming or binding even for complex logs where the grain of the wood might tend to drive the log into the working surface. Reducing the risk of jamming also reduces the force and power required to reliably split the log, thereby reducing the risk of injury presented when logs shatter rather than merely splitting, and also reducing the risk of damage to equipment during log splitting compared to prior designs.

Each of the cross blades 42 also defines the wing angle C relative to the working surface 20, as shown in FIG. 4C. A value of fifteen to twenty degrees (15°-20°) is optimal for the wing angle C. Angling the tips of the cross blades toward the tip of the main blade is advantageous for splitting complex logs because the wing angle C helps to direct the main body of the log away from the working surface 20. During inverted operation, the wing angle C and the tilt angle B permit the log to easily fall away from the cross blades 42 and main blade 40.

Each of the cross blades 42 preferably is joined to the main blade 40 at a distance D of four to eight inches (3"-8") from the working surface 20, as shown in FIG. 4C. The distance D permits split wood to pass easily between the cross blades 42 and the working surface 20. The distance D also defines a free length of the main blade 40 that extends from the cross blades 42 away from the working surface 20 to the tip of the main blade 40.

The main blade 40 preferably stands to a height H of nine to twelve inches (9"-14") from the working surface 20, as shown in FIG. 4C, slightly higher than the height of the skid plate 34, as shown in FIG. 3B. The height J of the skid plate and the height H of the main blade, as discussed below with reference to the ram 24, permit efficient operation of the log splitter 14 to grasp and lift the log, thereby permitting use of the log splitter to reposition logs or heavy objects, even where no splitting operation is needed. Because the main blade 40 extends beyond the height J of the skid plate 34, the main blade can be used to move and position logs on the ground for pickup. Additionally, the cross blade distance D, and the offset of the cross blade edges 46 from the main blade edge 44, permits using the free length of the main blade 40, between the distance D and the height H, to single-split extremely large logs on the ground. When single-splitting has reduced an extremely large log to manageable size, then the whole wedge 22 can be used to perform a four-way raised and inverted split into a truck, a trailer, or a similar container. For example, a twenty-four inch (24") diameter log may be single-split twice on the ground using just the free length of the main blade 40. Then the full wedge 22 may be used to lift and to four-way split each twelve-inch (12") quarter of the log into a container.

C. Ram

In the preferred embodiment of FIGS. 1-3, the ram 24 is a sturdy structure suitable to withstand a variety of climates while sustaining the forces of log splitting. The ram 24 is preferably slidably coupled to the beam 16 so as to slide along the working surface 20 by operation of the actuator 28, toward and away from the wedge 22. Alternatively, the ram 24 may be fixed to the beam 16 while the wedge 22 is adapted to slidably move along the working surface 20 toward and away from the ram. Still further, the present invention may be used with both the ram 24 and the wedge 22 coupled to respective actuators 28 and slidably movable along the working surface 20 toward and away from to one another. Surfaces of the ram that contact the working surface 20 may be made of brass or similarly corrosion- and wear-resistant, low-friction material for enhanced wear performance. The ram 24 includes a lug 50 or similar means for removably attaching the actuator 28, permitting repair or replacement of the actuator or the ram.

The ram 24 also includes a face plate 52 that opposes the wedge 22 and that engages the log for splitting. Optimally, weld beads 54 are formed in a scatter pattern on the face plate 52 so as to better engage and grip the log, and so as to reduce slipping of the log during splitting. Alternatively, the face plate 52 may be scored, hatched, gritted, or otherwise roughened to better grip an end of the log. Providing a slightly concave shape to the face plate 52 may also be helpful in gripping the log. In another embodiment, side plates 94 may extend slightly beyond the face plate 52 so as to catch against the log and more firmly hold the log in place. The face plate 52 extends from the working surface 20 to a height K slightly less than the corresponding heights J and H of the skid plate 34 and of the wedge 22. Accordingly, the ram 24 can be moved by the actuator 28 along the working surface 20 to clamp the log against the wedge 22, especially when the loader arms 12 are lowered to the ground to pick up a log for movement and/or splitting, causing the wedge and the skid plate 34 to support the log splitter 14 in an inverted position.

D. Log Opening

The ram 24 opposes the wedge 22 to define the log opening 26. Moving the ram 24 relative to the wedge 22 to clamp, to release, or to split the log changes a width W of the log opening 26. In a preferred embodiment, the width W varies from one inch (1") (the ram 24 nearly contacting the wedge 22) to twenty-six inches (26") (the ram 24 and the wedge 22 fully withdrawn from one another). The maximum log opening width, with a twelve inch (12") main blade tip height, permits the log splitter 14 to receive logs weighing more than two hundred (200) pounds.

In a preferred embodiment, the midpoint of the log opening 26 is offset by a distance F from a midplane P defined by the loader arms 12. The distance F allows the tractor operator to keep the log, the wedge 22, and the working surface 20 in constant view while sitting in an operator seat 55 associated with the tractor 10. This allows the operator to align the log opening 26 with a log for picking up the log, then to monitor log splitting from the seat of the tractor, thereby enabling the operator to accomplish a large log splitting job expeditiously without leaving the seat 55. While the distance F will vary depending on the sight lines characteristic of a particular model of front loader tractor, in an exemplary embodiment the log splitter 14 is installed on the loader arms 12 of a John Deere® model 2210 tractor 10, and the distance F is between about twenty inches (20") and about forty inches (40").

Offsetting the midpoint of the log opening 26 makes the log splitter 14 more effective than prior designs for the purpose of splitting wood directly into a container. The offset location of the splitting action allows the operator to drive up to the container at a near parallel position while carrying a log in the splitter 14, allowing for maximum flexibility when performing the log splitting process.

An additional advantage of the offset log opening is that, in operation, the log splitter 14 can be used to move logs or branches having lengths greater than the log opening width W. That is, by using the ram 24 and the wedge 22 to grasp a log transversely near its midpoint, the log can be carried parallel to the tractor 10. For example, a log of eight (8) feet length and five (5) inches diameter, weighing approximately two hundred (200) pounds, could be carried alongside the tractor and positioned on a pile where the log could be cut to manageable size. Thus, the offset log opening 26 can be selected to make the log splitter 14 convenient not only for splitting logs, but also for transporting lengthy logs to a central cutting area.

E. Actuator and Hydraulic System

In a preferred embodiment shown in FIGS. 1-3, the actuator 28 is operable to move the ram 24 reciprocatingly along the working surface 20, toward and away from the wedge 22, so as to narrow or widen the width of the log opening 26. In another embodiment, the actuator 28 is operatively connected to the wedge 22 for movement thereof toward and away from the ram 24 fixedly attached to the beam 16. In yet another embodiment, the ram 24 and the wedge 22 may each be coupled to a respective actuator 28 for relative movement of the ram and the wedge to adjust the width of the log opening 26.

The actuator 28 may be a worm screw and rack, a pinion and rack, a pneumatic ram, a linear motor, a pulley and cable, or any similar means for actuating reciprocating motion. The actuator 28 may have a variety of power connections including pneumatic, DC electrical, AC electrical, belt, chain, or reciprocating or rotating shaft. In the preferred embodiment, the actuator is a hydraulic cylinder 28 powered by a hydraulic system external to the host vehicle on which log splitter 14 is mounted. Alternatively, the hydraulic cylinder 28 may be powered by an OEM tractor hydraulic system that is capable to supply sufficient volume and pressure for efficient operation of the splitter 14. In the preferred embodiment, the hydraulic cylinder 28 has fittings for fluid connection to a hydraulic manifold 56. Optimally, the fittings are hydraulic hose quick-connects so that the actuator can be rapidly attached to or removed from the hydraulic system, thereby enabling the log splitter 14 to be quickly mounted on or removed from the tractor.

The actuator 28 may be controlled by a variety of means including buttons or switches. Ideally, the control means are provided at a location where the operator may control log splitter 14 without leaving the seat 55 of the tractor 10. In the preferred embodiment shown in FIG. 5, a joystick 58 is operable to move a spool of the hydraulic manifold 56, thereby directing a flow of hydraulic fluid from a hydraulic pump 60 to move the hydraulic cylinder 28. Hydraulic piping or hydraulic hoses fluidly connect the hydraulic manifold 56 to the hydraulic cylinder 28, to the hydraulic pump 60, and to a hydraulic reservoir 62. While hydraulic piping is durable and low-maintenance, hydraulic hoses are less costly and are easy to install or to remove. In the preferred embodiment shown in FIG. 6, the hydraulic pump 60 is external to the tractor 10, but the hydraulic manifold 56 could also be connected to an OEM hydraulic system of the tractor capable of supplying sufficient power to efficiently operate the log splitter 14.

Figure 5:
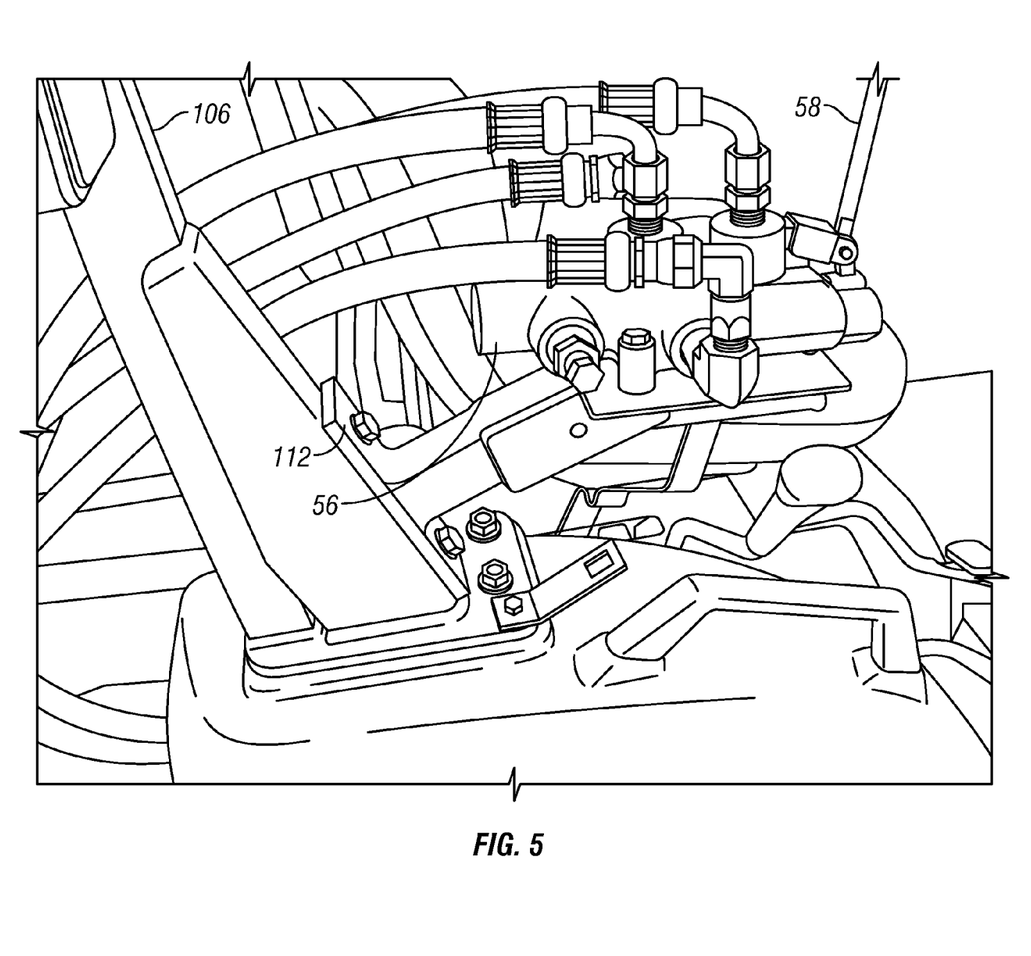
FIG. 5 is a perspective view of a hydraulic manifold and a joystick for controlling the log splitter of FIGS. 1-3, according to an embodiment of the present invention.
Figure 6:
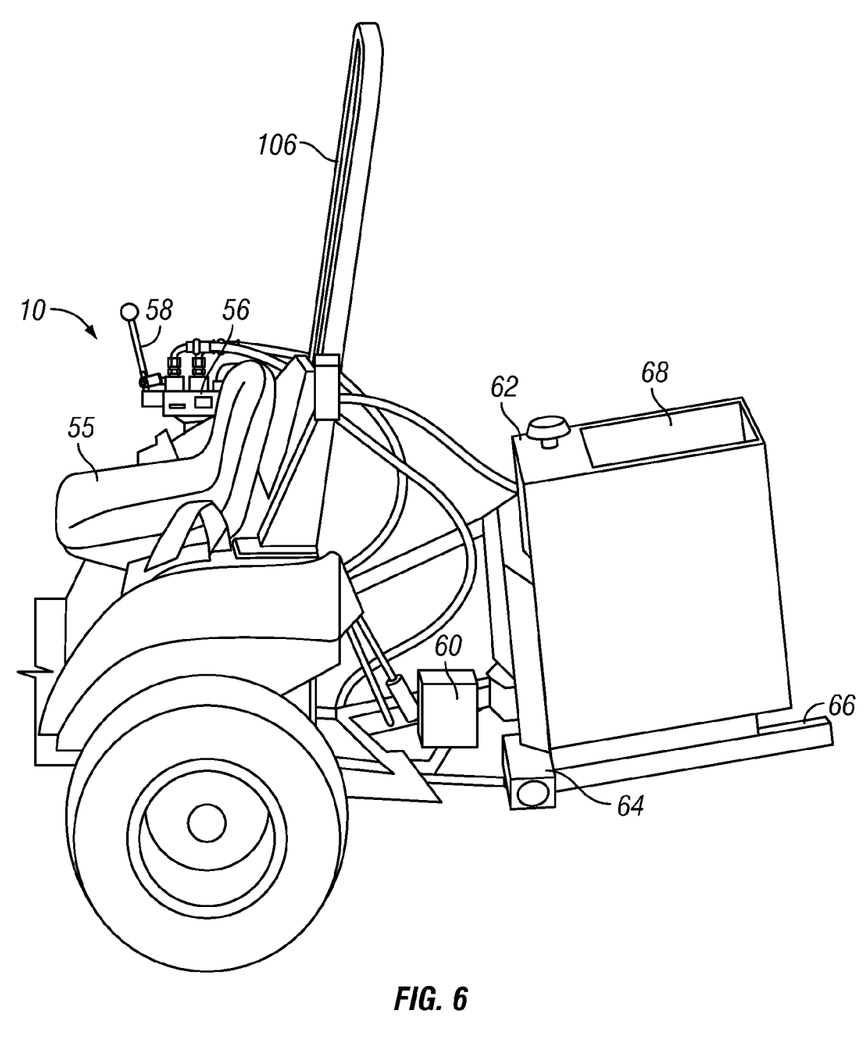
FIG. 6 is a perspective view of a hydraulic reservoir and a hydraulic pump for use with the log splitter of FIGS. 1-3, according to an embodiment of the present invention.

In a preferred embodiment, as shown in FIG. 5, the hydraulic manifold 56 and the joystick 58 are located at a comfortable and convenient distance from the factory-installed joystick and the factory-installed hydraulic manifold that control the loader arms 12, so that the tractor operator easily can control the loader arms and the log splitter 14. A support bracket 112 that is mounted to a roll bar 106 of the tractor 10 supports the weight of the joystick 58, the hydraulic manifold 56, the hydraulic piping or hoses, and the operator's arm. The support bracket 112 positions the joystick 58 near the factory-installed joystick to enable frequent movement of both joysticks with minimal operator fatigue, thereby permitting the operator to efficiently operate the log splitter and the tractor essentially simultaneously while remaining in the seat 55.

Optionally, the manifold 56 and the joystick 58, or another equivalent controller, may be located adjacent the actuator 28, enabling the tractor operator or another person to operate the splitter 14 while the tractor 10 is parked. For splitting logs of moderate weight, operating the splitter 14 from adjacent the actuator 28 may be an efficient mode of operation.

The hydraulic reservoir 62 preferably is of seven to twenty (7-20) gallons capacity. Hoses fluidly connect the hydraulic reservoir 62 to the hydraulic pump 60. In the preferred embodiment shown in FIG. 6, the hydraulic reservoir 62 is mounted on a reservoir support 64 that is removably attached to a three-point hitch installed at a rear end of the tractor. Preferably, the reservoir support 64 can be attached to the tractor hitch, without use of hand tools, while the reservoir support rests on the ground. For example, the reservoir support 64 can be attached to the tractor hitch by ball pins similar to known tractor tow attachment mechanisms. The reservoir support 64 includes a box tube trailer hitch or receiver hitch 66 protruding rearward from its lower portion. The reservoir support 64 also includes a ballast box 68 for receiving loose rock, dirt, or ballast weights to counterbalance the weight of the log, and to stabilize the tractor 10 during log splitting operations. Additionally, the support 64 can include means for holding various tools, such as a compartment, or clips, clamps, straps, or chains.

In a preferred embodiment, the hydraulic pump 60 provides twenty to twenty-five gallons per minute (20-25 gpm) rated flow capacity to drive the hydraulic cylinder 28 at a cycle time of six seconds (6 sec). While some tractors have large factory-installed hydraulic pumps with sufficient flow capacity to efficiently power log splitters or other accessory equipment, the hydraulic pump 60 is provided as an external component to enable use of the log splitter 14 with tractors lacking large factory-installed hydraulic pumps. Thus, operation of the log splitter 14 will not interfere with efficient and substantially simultaneous operation of the tractor 10, in particular operation of the loader arms 12. In a preferred embodiment of FIG. 6, the hydraulic pump 60 is rigidly detachably fastened to the reservoir support 64. Fastening the hydraulic pump 60 to the reservoir support 64 enables quick, one-piece installation or removal of the hydraulic reservoir and the hydraulic pump. The hydraulic pump 60 alternatively may be bolted to a chassis beam of the tractor.

The hydraulic pump 60 may be driven electrically, pneumatically, or mechanically as by a belt or chain. The hydraulic pump 60 may have its own power source, such as a small two-stroke engine, or it may take its power from the tractor 10. In a preferred embodiment, a coupler operatively connects a driveshaft of the pump 60 to a power take off assembly (PTO) of the tractor 10, optimally a rear PTO. The driveshaft alternatively may be coupled to a middle PTO or to a front PTO.

F. Installation and Operation

Preferable installation and operation of the log splitter 14 of the present invention will be generally described below.

To install the log splitter 14 on the loader arms 12, the tractor operator lowers the loader arms so that any previously installed attachment is supported on the ground. The tractor operator then detaches the previously installed attachment according generally to the manufacturer's instructions, and moves the tractor 10 and the loader arms 12 to engage the frame 18 of the splitter 14 as the splitter 14 rests on the ground. Having engaged the frame 18 with pin devices and hydraulic hose quick connects, the operator then can proceed with operation of the tractor 10 and the log splitter 14.

To split a large log on the ground, the tractor operator drives the tractor 10 toward the log while operating the joystick 58 to actuate the hydraulic cylinder 28 so that the log opening 26 is at maximum width. The operator then positions the log splitter 14 so that the log opening 26 engages the log. Commonly, with the log positioned on the ground, the beam 16 will be pivoted to the inverted position by moving the factory-installed joystick of tractor 10 to the dumping position. The operator then moves the joystick 58 to actuate the hydraulic cylinder 28, thereby grabbing the log with each of the wedge 22 and the ram 24 contacting an end of the log, as shown in FIG. 1. Alternatively, the operator may use the splitter 14 to grab a log with each of the wedge 22 and the ram 24 contacting the outer surface of the log. With the log engaged in the log opening, the operator then operates the joystick to actuate the hydraulic cylinder, thereby moving the ram 24 relative to the wedge 22 to decrease the width of the log opening 26. The ram drives the log against the splitting edges 44, 46, causing the log to split, ideally into four pieces.

To split a smaller log into the container, the operator drives the tractor toward the log while fully retracting the hydraulic cylinder. The operator then engages the log within the log opening, and partially actuates the actuator to securely grip the log between the ram and the wedge. The operator then raises the loader arms 12 and drives the tractor to the container. With the log splitter 14 raised above the container, and preferably in the inverted position, the operator fully actuates the actuator to drive the ram toward the wedge, thereby splitting the log. As the log splits, ideally into four pieces, the pieces fall away from the log splitter 14 into the container.

G. Advantages

One advantage of the present invention is that using a front-loader tractor as the host vehicle for the portable powered log splitter makes the log splitter accessible to and usable by a wide range of customers. Many of these customers would not use a log splitter mounted to a skid steer loader. Skid loaders or skid steers typically are used in construction site environments where there is little concern for tearing up the ground in the work area. Skid steers are not designed to minimize damage to finished yard areas. Thus, an average homeowner who needs to move over a finished yard would not use a portable powered log splitter, or any other implement, installed on a skid steer loader.

Another advantage of the present invention is that installing the portable powered log splitter on the loader arms of a front-loader tractor provides greater efficiency and ease of use than is provided by a portable powered log splitter installed on a skid steer or towed by a tractor. Known designs for splitters mounted on skid steers or towed by tractors are not optimal for picking logs up from the ground, or for discharging split logs to a truck bed. The splitter of the present invention can be operated from the seat of the tractor, without getting down from the seat to handle the logs.

A further advantage of the present invention is that the operator can remain in the operator seat and can operate the log splitter from a distance of seven to ten feet. Additionally, the log splitter can be operated while the log is either pressed against the ground, or raised in the air above a container. Thus, the present invention enables one person to split logs without being exposed to the risks of injury inherent in balancing a large log on the splitter with one hand while operating hydraulics with the other. Therefore, the present invention greatly enhances the safety of log splitting relative to prior art methods and devices that require the operator to stand in close proximity to the log.

Yet another advantage of the present invention is that the arrangement of the skid box and skid plate protects the actuator from directly impacting the ground, permits sufficient airflow to cool the actuator during extended operation, and provides easy access for repair, removal, and replacement of the actuator.

H. Alternative Embodiments

Although this invention has been shown and described with respect to the detailed embodiments thereof, it will be understood by those skilled in the art that various changes in form and detail thereof may be made without departing from the spirit and the scope of the invention.

For example, a controller could be provided at the actuator rather than or in addition to the controller at the operator seat; this would enable the operator to park the tractor near a pile of smaller logs and bring the logs to the splitter, rather than driving the tractor to pick up each individual log.

As another example, rather than using an external hydraulic system powered by the tractor's power take off, the actuator could be air-driven, belt-driven, electrically motorized, or driven from the tractor's factory-installed hydraulic system.

As a further example, the wedge could be movably coupled to the frame and the ram could be fixed to the frame.

As yet another example, the actuator could move both the ram and the wedge on the frame relative to one another. Alternatively, the splitter could be provided with two opposing wedges, both wedges or either wedge being movably coupled to the frame.

Yet further, it will be obvious to one of skill in the art that the attachment of the frame 18 to the loader arms 12 will vary by OEM and even by tractor model. Similarly, the support bracket 112 must be made not to compromise OEM safety ratings of the tractor roll bar. This requirement may require varying mount mechanism designs to allow for mounting of actuator valve 56 to tractor. Further, all components, angles, dimensions, assemblies, and description of embodiments of said invention are presented for the subcompact tractor class of tractor. All details can be scaled up appropriately to accommodate installation of log splitter 14 to larger tractors or host vehicles.

The foregoing description of embodiments of the invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to use the invention in various embodiments and with various modifications as suited to the particular uses contemplated. It is intended that the scope of the invention be defined by the claims appended hereto.

What is claimed is:

1. A self-propelled log splitter comprising:
a tractor with articulated front loader arms, and with a hitch extending rearward from the tractor;
a ballast mounted to the rearward hitch of the tractor;
a frame including a working surface for contacting a log, the frame being mounted across the loader arms with the working surface angled between about thirty degrees and about fifty degrees with respect to the loader arms;
a ram coupled to the frame;
a wedge coupled to the frame opposing the ram across the loader arms, the wedge including a main blade attached to and extending away from the frame and a cross blade extending from opposed sides of the main blade, with a cross edge of the cross blade offset from a main edge of the main blade toward or away from the ram; at least one cross blade being angled away from the working surface by a non-zero tilt angle around the cross edge and at least one cross blade being angled away from the working surface by a non-zero wing angle around the juncture of the cross blade to the main blade;
an actuator movably coupling one of the ram or the wedge to the frame, that one of the ram or the wedge being slidingly coupled to the frame for motion across the loader arms, and the other of the ram or the wedge being fixedly coupled to the frame;
and a controller operable to direct the motion of the actuator,
wherein the wedge and the ram cooperate to define a log opening across the loader arms for receiving a log, the log is split by moving the ram toward the wedge so as to force the log sequentially against the main edge and the cross edge of the wedge, and the ballast counterbalances the log and loader arms so that the tractor may be maneuvered with the loader arms raised to position the log in a dumping position above a truckbed during splitting, loader arms being adjustable between a loading position and the dumping position.

2. A self-propelled log splitter comprising:
a tractor with articulated front loader arms, and with a hitch extending rearward from the tractor;
a ballast mounted to the rearward hitch of the tractor;
a frame including a working surface for contacting a log, the frame being mounted across the loader arms;
a ram coupled to the frame;
a wedge coupled to the frame opposing the ram across the loader arms, the wedge including a main blade attached to and extending away from the frame and a cross blade extending from opposed sides of the main blade, with a cross edge of the cross blade offset from a main edge of the main blade toward or away from the ram, and the cross blade being angled away from the working surface at a tilt angle of between about five degrees and about fifteen degrees around the cross edge;
an actuator movably coupling one of the ram or the wedge to the frame, that one of the ram or the wedge being slidingly coupled to the frame for motion across the loader arms, and the other of the ram or the wedge being fixedly coupled to the frame; and a controller operable to direct the motion of the actuator, wherein the wedge and the ram cooperate to define a log opening across the loader arms for receiving a log, the log is split by moving the ram toward the wedge so as to force the log sequentially against the main edge and the cross edge of the wedge, and the ballast counterbalances the log and loader arms so that the tractor may be maneuvered with the loader arms raised to position the log in a dumping position above a truckbed during splitting, loader arms being adjustable between a loading position and the dumping position.

3. A self-propelled log splitter comprising:

a tractor with articulated front loader arms, and with a hitch extending rearward from the tractor;

a ballast mounted to the rearward hitch of the tractor;

a frame including a working surface for contacting a log, the frame being mounted across the loader arms;

a ram coupled to the frame;

a wedge coupled to the frame opposing the ram across the loader arms, the wedge including a main blade attached to and extending away from the frame and a cross blade extending from each side of the main blade, with a cross edge of each cross blade offset from a main edge of the main blade toward or away from the ram, and each cross blade being angled away from the working surface by a wing angle of between about fifteen degrees to about twenty degrees around the juncture of the cross blade with the main blade;

an actuator movably coupling one of the ram of the wedge to the frame, that one of the ram or the wedge being slidingly coupled to the frame for motion across the loader arms, and the other of the ram or the wedge being fixedly coupled to the frame; and a controller operable to direct the motion of the actuator, wherein the wedge and the ram cooperated to define a log opening across the loader arms for receiving a log, the log is split by moving the ram toward the wedge so as to force the log sequentially against the main edge and the cross edge of the wedge, and the ballast counterbalances the log and loader arms so that the tractor may be maneuvered with the loader arms raised to position the log in a dumping position above a truckbed during splitting, loader arms being adjustable between a loading position and the dumping position.

4. A log splitter comprising:

a frame with a working surface;

a ram movably coupled to the frame;

a wedge mounted to the working surface of the frame, and including a main blade extending from the working surface and a cross blade extending from each side of the main blade, with a cross edge of each cross blade offset from a main edge of the main blade toward or away from the ram, so that a log being pressed against the wedge will contact sequentially either the main edge or the cross edges, then the cross edges or the main edge, respectively, thereby reducing the power required to split the log into four segments, each cross blade being tilted away from the working surface by a tilt angle between about five degrees and about fifteen degrees around the cross edge, so that a log being pressed against the wedge will be directed away from the working surface as the log is split by said wedge, and each cross blade also being tilted away from the working surface by a wing angle of between about fifteen degrees and about twenty degrees around the juncture of the cross blade to the main blade, so that a log being pressed against the wedge will be split without binding between the wedge and the frame;

and an actuator movably coupling the ram to the frame for moving the ram toward or away from the wedge to define an adjustable log opening therebetween.

* * * * *